United States Patent
Vera

(10) Patent No.: US 12,480,819 B2
(45) Date of Patent: Nov. 25, 2025

(54) MEASURING THE SPEED OF ELECTROMAGNETIC WAVE PROPAGATION IN A FLUID WITHIN A CONDUIT

(71) Applicant: Saudi Arabian Oil Company, Dhahran (SA)

(72) Inventor: Alejandro M. Vera, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 374 days.

(21) Appl. No.: 17/994,986

(22) Filed: Nov. 28, 2022

(65) Prior Publication Data
US 2024/0175759 A1 May 30, 2024

(51) Int. Cl.
*G01J 7/00* (2006.01)

(52) U.S. Cl.
CPC ........................... *G01J 7/00* (2013.01)

(58) Field of Classification Search
CPC ..................... G01J 7/00; G01F 1/66
See application file for complete search history.

(56) References Cited

U.S. PATENT DOCUMENTS

| | | | |
|---|---|---|---|
| 6,587,798 B2 | 7/2003 | Kersey et al. | |
| 6,707,307 B1 | 3/2004 | McFarlane et al. | |
| 7,882,750 B2 * | 2/2011 | Davis | G01F 1/7082 73/861.18 |
| 2002/0100327 A1 * | 8/2002 | Kersey | G01N 29/024 73/64.53 |

* cited by examiner

*Primary Examiner* — Stephen D Meier
*Assistant Examiner* — Leo T Hinze
(74) *Attorney, Agent, or Firm* — Fish & Richardson P.C.

(57) ABSTRACT

Systems and methods include a method for determining wave propagation speed. Spatio-temporally-sampled data for electromagnetic (EM) wave propagation through a fluid in a conduit is acquired for different instants of time from each antenna of an array of antennas distributed at predetermined locations. A k-ω plot plotting curves having a kinematic relationship ω=ck is generated based on the spatio-temporally-sampled data and using a spectral-based algorithm, where ω is an angular frequency of a spectral component of EM disturbances, k is a wavenumber, and c is an unknown speed of the EM wave propagation. A spectral ridge on the curves is identified using the k-ω plot. Parameters for calculating a slope of the spectral ridge are determined. The slope of the spectral ridge is determined. The speed of EM wave propagation is determined assuming a relation between the speed of EM wave propagation and the slope of the spectral ridge.

20 Claims, 4 Drawing Sheets

MEASURING THE SPEED OF ELECTROMAGNETIC WAVE PROPAGATION IN A FLUID WITHIN A CONDUIT

TECHNICAL FIELD

The present disclosure applies to processing electromagnetic (EM) signals.

BACKGROUND

In extracting oil and gas from formations, it is advantageous to monitor the flow rates of different components of the production fluids, usually gas, oil, and water. It has been established that the speed of EM wave propagation of a mixture can be used to determine the volumetric phase fractions of the components. For example, the speed of EM wave propagation in a mixture can be directly related to the speed of EM propagation of each component of the mixture.

Techniques for determining the speed at which an EM wave travels along an array of antennas have been developed for use in the field of radar sensing. For example, a technique called beamforming can be used to determine the direction of arrival (DOA) of an EM wave reflected from an object of unknown location. This can be done by combining and optimizing signals received by each element in an antenna array in such a way that signals at particular angles of incidence experience constructive or destructive interference. Also, knowing the speed of EM wave propagation in air enables the determination of the direction of arrival of the EM wave. Many different processing techniques have been developed for use in such applications, including techniques aimed at extracting from an array of antennas the speed at which a wave travels across an array of antennas.

In contrast to radar applications, in a production fluid flowing through a conduit, the intention is to measure the speed of EM wave propagation instead of the direction of propagation. Inside a conduit or pipe, the EM wave is essentially traveling either upstream or downstream as a planar EM wave, so the direction is known.

SUMMARY

The present disclosure describes techniques that can be used for measuring the speed of electromagnetic wave propagation in a fluid within a conduit. In some implementations, a computer-implemented method includes the following. Spatio-temporally-sampled data for electromagnetic (EM) wave propagation through a fluid in the conduit is acquired at each of a number of instants of time from each antenna of an array of at least two antennas distributed at predetermined locations along a conduit. A k-ω plot plotting curves having a kinematic relationship ω=ck is generated based on the spatio-temporally-sampled data and using a spectral-based algorithm technique, where ω is an angular frequency of a spectral component of EM disturbances, k is a wavenumber, and c is an unknown speed of the EM wave propagation. A spectral ridge on the curves is identified using the k-ω plot, and parameters for calculating a slope of the spectral ridge are determined. The slope of the spectral ridge is determined, and the speed of EM wave propagation is determined assuming a relation between the speed of EM wave propagation and the slope of the spectral ridge.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Measurement principles used in the techniques of the present disclosure do not require calibration. The measurement principles also provide a full-bore measurement, detecting all volumes of fluids. Measurement principles work with lossy and non-lossy fluids. A system using the techniques of the present disclosure can work at any frequency (broadband) for which designed use of the antennas. The system does not rely on the use of costly vector network analyzers, but instead the data can be acquired by radio frequency (RF) digitizers or fast analogue-to-digital converters.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
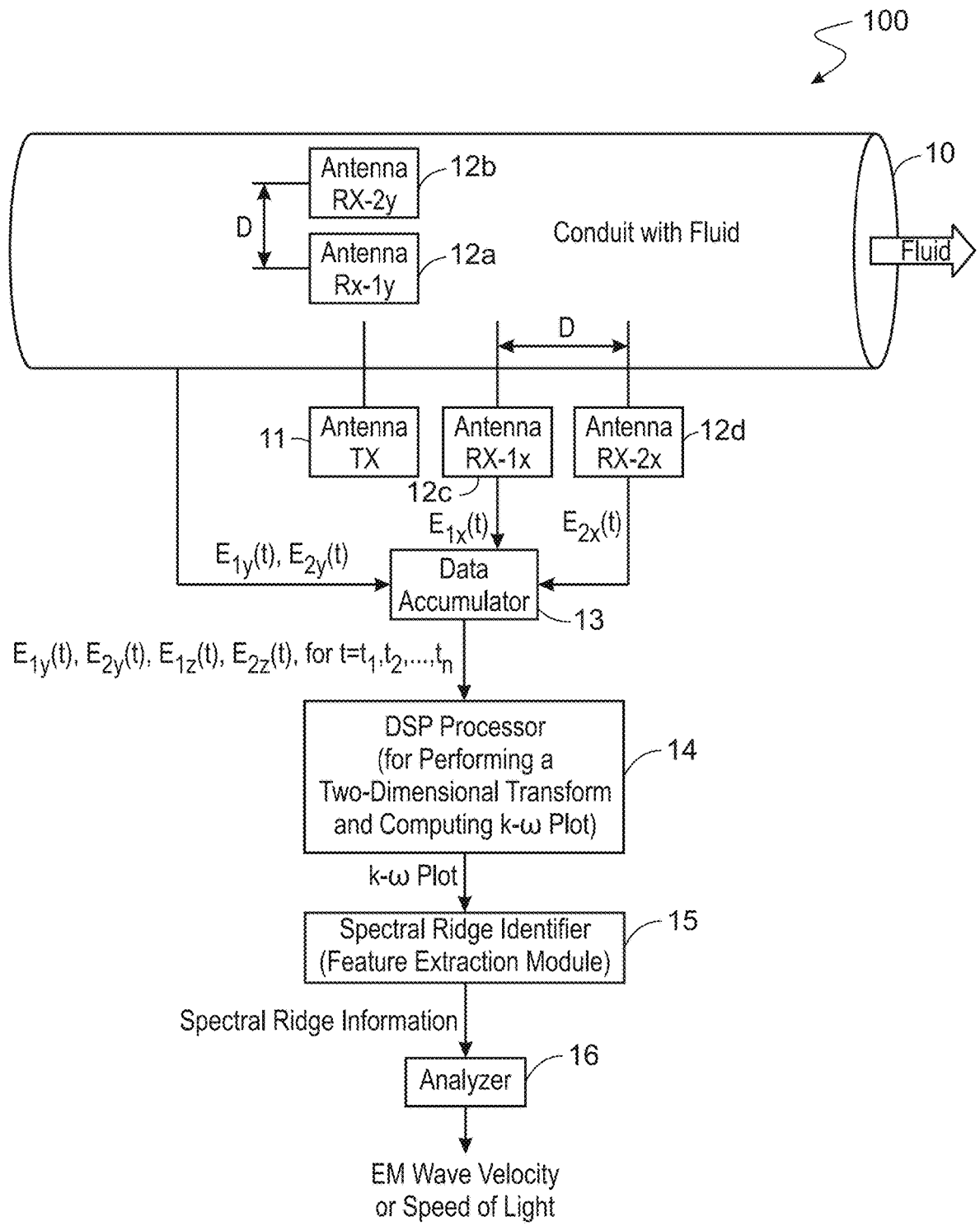
FIG. 1 is a block diagram showing an example of a system for determining the speed of electromagnetic wave propagation in a fluid within a conduit, according to some implementations of the present disclosure.

The following detailed description describes techniques for processing electromagnetic (EM) signals, and more particularly to the field of measurement of the speed of EM wave propagation in a medium of unknown constituents when the direction of propagation is known, such as when EM waves propagate in a fluid within a conduit or pipe. As such, techniques of the present disclosure can be used to measure the electric permittivity of fluids. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure describes techniques and features that can solve problems identified in the Background. This includes determining the speed of EM wave propagation in a fluid within a conduit. This can be done by adopting the methodologies of radar signal processing to what is essentially the inverse of the problem solved in that field. For example, information provided by an array of antennas can be used to directly measure the speed of electromagnetic wave propagation within a conduit in which the direction of approach is known to be aligned with an axis of the array. Specifically, the speed is determined not by the direction of approach of an electromagnetic wave but by instead using an array of antennas directly to measure the speed.

In more detail, the present invention provides a method and corresponding system for measuring the speed of EM wave propagation in a fluid contained within a circular elongated conduit. The EM wave can travel as a plane wave across the pipe diameter and/or along the elongated part of the conduit. The EM wave can cause a momentary change in antenna response in a portion of the fluid as the EM wave traverses the portion of the fluid. In general, the method includes the steps of: 1) providing, at predetermined locations, an array of at least two antennas distributed around the circumference and/or along the elongated body, where each antenna is configured to sense spatio-temporally sampled data; 2) acquiring the spatio-temporally sampled data from each antenna at each of a number of instants of time; 3) constructing a plot using a technique selected from the group consisting of spectral-based algorithms, such as the Capon method or the MUSIC method, in which a spectrum-like function of the speed of EM wave propagation is formed, and parametric methods of solution, such as the deterministic maximum likelihood method; 4) identifying, in the plot, a spectral ridge, and determining the parameters to calculate the slope of the spectral ridge; and 5) calculate the slope of the spectral ridge which determines the speed of EM wave propagation assuming a relation between the speed of EM wave propagation and the slope of the spectral ridge. A variation of this method is provided in FIG. 3.

Existing conventional techniques may involve the use of microwave resonators and microwave transmission sensors. In such cases, the microwave resonators may work only when the fluid mixture has low loss, while for high loss mixtures the microwave resonance peaks are highly attenuated or not visible. As such, the resonance frequency is a way to measure of the permittivity of low loss fluid mixtures.

For the case of microwave transmission sensors, the system usually consists of a microwave transmitter and a receiver. The transmission system can measure the microwave phase shift and amplitude attenuation of EM waves relative to the transmitted signal. The transmission method may require careful calibration of all the components that may affect the phase or attenuation of the signal, such as cables and attenuators. Moreover, the transmission method may require calibration of a vector network analyzer, for example, that reads the signal phase and attenuation.

FIG. 1 is a block diagram showing an example of a system 100 for determining the speed of electromagnetic wave propagation in a fluid within a conduit, according to some implementations of the present disclosure. For example, the system 100 can be used for measuring the speed of EM wave propagation in a fluid (e.g., liquid, gas, or multiphase fluid) within a conduit 10 past at least two antennas 12a and 12b and/or 11, 12c, and 12d. This constitutes what is often called a phased array of antennas, providing signals indicating any parameter that can be correlated to electromagnetic fluctuations at the location of the antennas at each of a number of successive instants of time. The outputs of each antenna in the array of antennas need to be recorded such that the time reference of each antenna is known relative to every other antenna. A data accumulator 13 can receive the signals from the antennas located around the circumference of the pipe and/or the antennas located along the axis of the pipe over a period of time during which from each antenna some predetermined number n of signals $E_{1x}(t_j)$, $E_{2x}(t_j)$, $E_{1y}(t_j)$, $E_{2y}(t_j)$ (for j=1, . . . , n) are provided. The antennas 12a and 12b can be used for all frequencies that the antennas are designed for, but the antennas 12c and 12d only operate when the transmitted frequencies are above the first cutoff frequency of the circular cylindrical duct or pipe.

With the accumulated data, in general, any one of the processing techniques used in beamforming or other array processing applications that construct a two-dimensional temporal/spatial transform can then be used to decompose the array of signals into its temporal and spatial bins, e.g., to provide what is called a dispersion plot or k-ω plot. Such a plot is useful in visualizing a temporal/spatial decomposition.

The accumulated signals can then be provided to a processor 14. The processor 14 can perform spatial/temporal decomposition, including computing a k-ω plot, with k representing the wavenumber for a spectral component and ω representing the corresponding angular frequency. For instance, the electromagnetic wave propagating in a vacuum can be such that all the one-dimensional electromagnetic energy in the signal lies on a line in the k-ω plane. In a non-dispersive medium (e.g., non-dispersive for the spectral frequencies of interest so that all spectral components propagate at the same speed), the slope of this line is the speed of light in the fluid. This is because of the kinematic relationship ω=ck, where ω is the angular frequency of a spectral component of the electromagnetic disturbances, k is the wavenumber, and c is the sought-after (unknown) speed of EM wave propagation.

For dispersive medium conditions, slight modifications to the spatial-temporal relation of the electromagnetic wave can be included in the method according to the present invention to account for the dispersive effects. This can be done without fundamentally altering the concepts underlying the present disclosure. Thus, the electromagnetic energy can be distributed over a well-defined region of the k-ω plane. If the electromagnetic waves are sufficiently energetic with respect to other disturbances, and if the electromagnetic waves are significantly broadband, then the electromagnetic wave signal can form a so called spectral ridge in a k-ω plot with the energy of each sector determining the height of the spectral ridge.

Once the k-ω plot is determined, a spectral ridge identifier 15 can examine the plot to identify any spectral ridges that may be revealed. Depending on the EM noise environment, spectral ridges may be discernible for EM waves propagating both upstream and downstream through the fluid in the conduit. Since, as mentioned above, a k-ω plot includes measured data on time stationary EM waves (e.g., EM disturbances) and the spatial wavelength and the temporal frequency of a spectral component of the EM waves are related through the phase velocity c of the components according to λv=c, the relation ω=ck follows by substituting k=2π/λ, and ω=2πv for λ and v, respectively. Thus, a spectral ridge in a k-ω plot (e.g., a plot with k as the abscissa, or x-coordinate, and ω as the ordinate, or y-coordinate) has a slope that is the average phase velocity of EM waves in the fluid. The spectral ridge identifier provides for each spectral ridge it identifies information sufficient to indicate a slope of the spectral ridge. An analyzer 16 can use the spectral ridge identifications to provide an overall assessment of the measured EM wave phase velocity in the fluid.

To the extent that the spectral ridge is straight, the phase velocity of EM waves is independent of frequency, e.g., there is no dispersion. Indeed, it is the case that there is little dispersion of EM waves in fluid (either gas or liquid) mixtures with low water content over the frequency range typically employed in multiphase flow measurements (e.g., from approximately 100 MHz to approximately 3000 MHz). Thus, the average phase velocity as measured as previously described is an accurate estimate of the speed of EM wave propagation of the fluid.

The EM wave fluctuations picked up by the antennas 12a and 12b and/or 12c and 12d are not harmonic. Rather, the antennas 12a and 12b and/or 12c and 12d are not harmonic and are a superposition of many spectral components of one or more complex EM waves (one or more since more than one EM wave may reach the sensors at the same time), and each complex EM wave includes its own spectral components. The processor 14 can perform a spectral analysis of the EM wave it detects so that what is plotted as a k-ω plot includes the wavenumbers and angular frequencies for the different harmonic components of at least one complex EM wave.

The processor 14 accounts for the possibility of multiple complex signals contributing to the signals provided by the antennas 12a and 12b and/or 12c and 12d. The processor 14 can extract, from the sample points $E_{1x}(t_j)$, $E_{2x}(t_j)$ and/or $E_{1y}(t_j)$, $E_{2y}(t_j)$ provided by the data accumulator 13, information sufficient to determine the relationship, if any, between the sample points $E_{1x}(t_j)$ and/or $E_{1y}(t_j)$ provided by one sensor and the sample points $E_{2x}(t_j)$ and/or $E_{2y}(t_j)$ provided by the other sensors.

By way of illustration of one way of performing the two-dimensional transform accomplished by the processor 14, a one-dimensional EM field including left-going and right-going (plane) waves can typically be represented as:

$$E(z,t)=E_o e^{-\alpha \cdot z} e^{-i \cdot (\omega \cdot t \pm \beta \cdot z)} \quad (1)$$

where z is a one-dimensional space variable, ω is a temporal frequency, $E_o$ is an initial amplitude, and c is the speed of EM wave propagation through the fluid. Equation (1) is valid for describing one-dimensional EM wave disturbances in any region of a conduit (pipe) section in which EM energy is neither substantially created nor destroyed (e.g., where it is reasonable to assume that there are no EM wave sources or EM wave absorbers within the antenna array length).

The approach of the present disclosure effectively isolates EM wave signals (via the spatial/temporal decomposition) from other signals that may exist in the fluid or that are generated electrically by the measurement system. Even if such other signals are the result of traveling waves through other nearby media (e.g., from the structure in which the EM measurements are taken), the spatial/temporal structure of the EM waves signals is typically distinguishable from the different EM signals. As such, the EM wave signals can serve as a basis for providing a reliable estimate of the speed of EM wave propagation in the fluid.

Processing the data as previously described can be performed in any spatio-temporal domain (such as the frequency/spatial x-ω domain used in equation (1), the temporal/spatial x-t domain, and the temporal/wavenumber k-t domain). However, in some preferred implementations, the frequency/wavenumber k-ω domain can be used. Equation (1) can be represented in the k-ω domain by taking a spatio-temporal 2D Fourier transform of Equation (1), resulting in the following k-ω representation:

$$E(\omega,k)=\int_{-\infty}^{+\infty}\int_{-\infty}^{+\infty}E(z,t)e^{-i\cdot(\omega\cdot t\pm\beta\cdot z)}dz\cdot dt \quad (2)$$

where k is the wavenumber, and ω is temporal frequency.

Equation (2) shows a strong spatial/temporal structure of the EM field. In the k-ω plane, the function E(k,ω) can include two ridges, one along the line ω=+ck, and one along the line ω=−ck. Techniques of the present disclosure can capture enough measurements to distinguish these ridges from other features of the measurement, so as to be able to deduce the value of the speed of EM wave propagation. The techniques of the present disclosure can do so by performing a two-dimensional transform of the sensor data, from the x-t domain to the k-ω domain. The data can then be analyzed, as previously described, to determine the speed of EM wave propagation (assuming that, for each spectral component, ω=kc). The techniques of the present disclosure can comprehend any spectral or parametric method of performing the two-dimensional transform. This can include, for example, the CAPON method, the MUSIC method, and the deterministic maximum likelihood method. All such methods can address handling the windowing (sampling) problem differently, and so some methods are better than others in particular situations.

Figure 2:
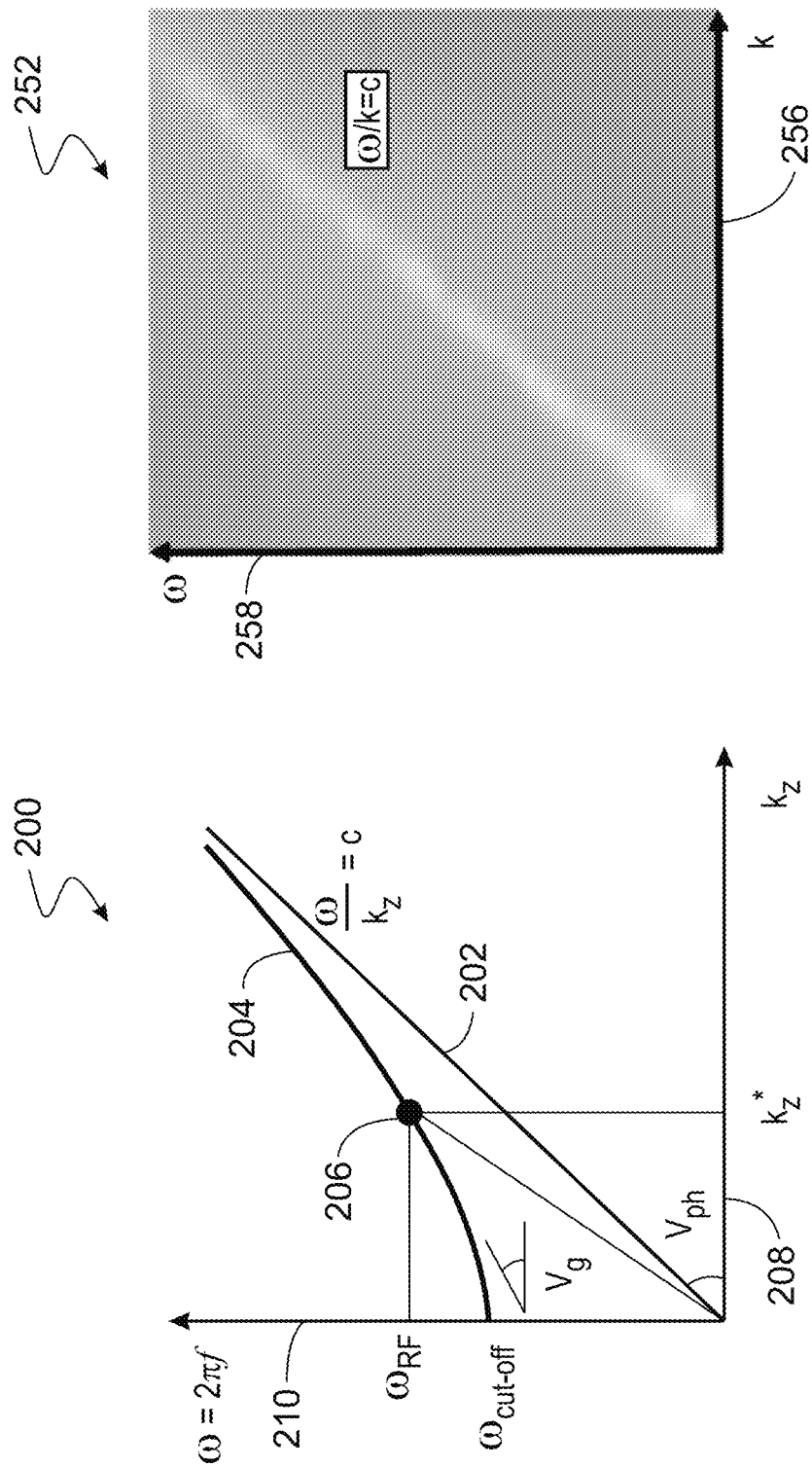
FIGS. 2A and 2B show examples of a k-ω plot, according to some implementations of the present disclosure.

FIG. 2A and FIG. 2B show examples of k-ω plots 200 and 252, according to some implementation of the present disclosure. The plot 200 shows a $w_i/k_i$=c line 202 and a curve 204, with point 206, all plotted relative to a k axis 208 and a w axis 210. Plot 252 includes individual plots corresponding to a single EM wave travelling in a lossless medium, plotted relative to k axis 256, and w axis 258.

Figure 3:
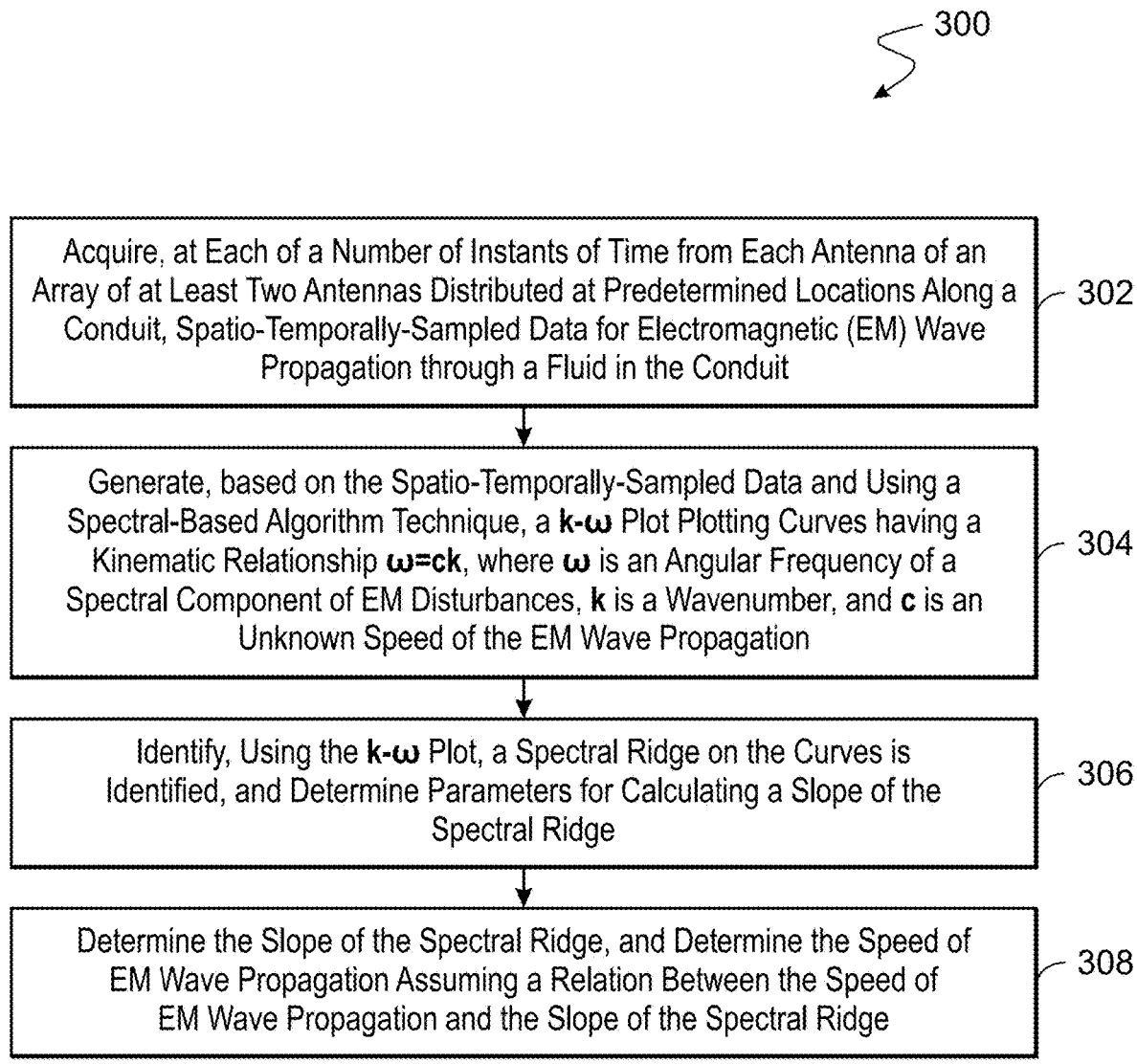
FIG. 3 is a flowchart of an example of a method for measuring the speed of electromagnetic wave propagation in a fluid within a conduit, according to some implementations of the present disclosure.

FIG. 3 is a flowchart of an example of a method 300 for measuring the speed of electromagnetic wave propagation in a fluid within a conduit, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, spatio-temporally-sampled data for electromagnetic (EM) wave propagation through a fluid in a conduit is acquired at each of a number of instants of time from each antenna of an array of at least two antennas distributed at predetermined locations along the conduit. For example, the array of at least two antennas includes antennas that can be distributed around a circumference of the conduit. The fluid can be a liquid, a gas, or a multiphase fluid. From 302, method 300 proceeds to 304.

At 304, a k-ω plot plotting curves having a kinematic relationship ω=ck is generated based on the spatio-temporally-sampled data and using a spectral-based algorithm technique, where ω is an angular frequency of a spectral component of EM disturbances, k is a wavenumber, and c is an unknown speed of the EM wave propagation. As an example, the spectral-based algorithm technique can use a spectrum-like function of a speed EM wave propagation formation and parametric methods of solution. The spectral-based algorithm technique can include spectral-based algorithms using a deterministic maximum likelihood method such as a Capon method and a MUSIC method, for example. As an example, the plot 200 can be generated, as described with reference to FIG. 2A. From 304, method 300 proceeds to 306.

At 306, a spectral ridge on the curves is identified using the k-ω plot, and the parameters to calculate the slope of the spectral ridge are determined. As an example, the plots 200 and 250 can be generated, as described with reference to FIGS. 2A and 2B. From 306, method 300 proceeds to 308.

At 308, the slope of the spectral ridge is calculated which determines the speed of EM wave propagation assuming a relation between the speed of EM wave propagation and the slope of the spectral ridge. There are several ways to determine the slope of the spectral ridge. One method is to build a velocity-power histogram from the k-ω plot data. The k-ω plot is a 3D plot of wavenumber (k), angular frequency (ω), and power that represent the propagating wave. Every k-ω coordinate is an actual velocity value, c=ω/k. The color or shading assigned to that coordinate on the k-ω plot depends on the power calculated during the generation of the k-ω plot. The histogram will identify the value of velocity with the highest power which is the actual EM wave phase velocity that does not need any calibration. After 308, method 300 can stop. The phase velocity is used to calculate the medium permittivity or conductivity defined by the expression:

$$v_\phi = \frac{\omega}{\beta} = \frac{1}{\sqrt{\frac{\mu\epsilon}{2}\left[1+\sqrt{1+\left(\frac{\sigma}{\omega\epsilon}\right)^2}\right]}} \quad (3)$$

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 4:
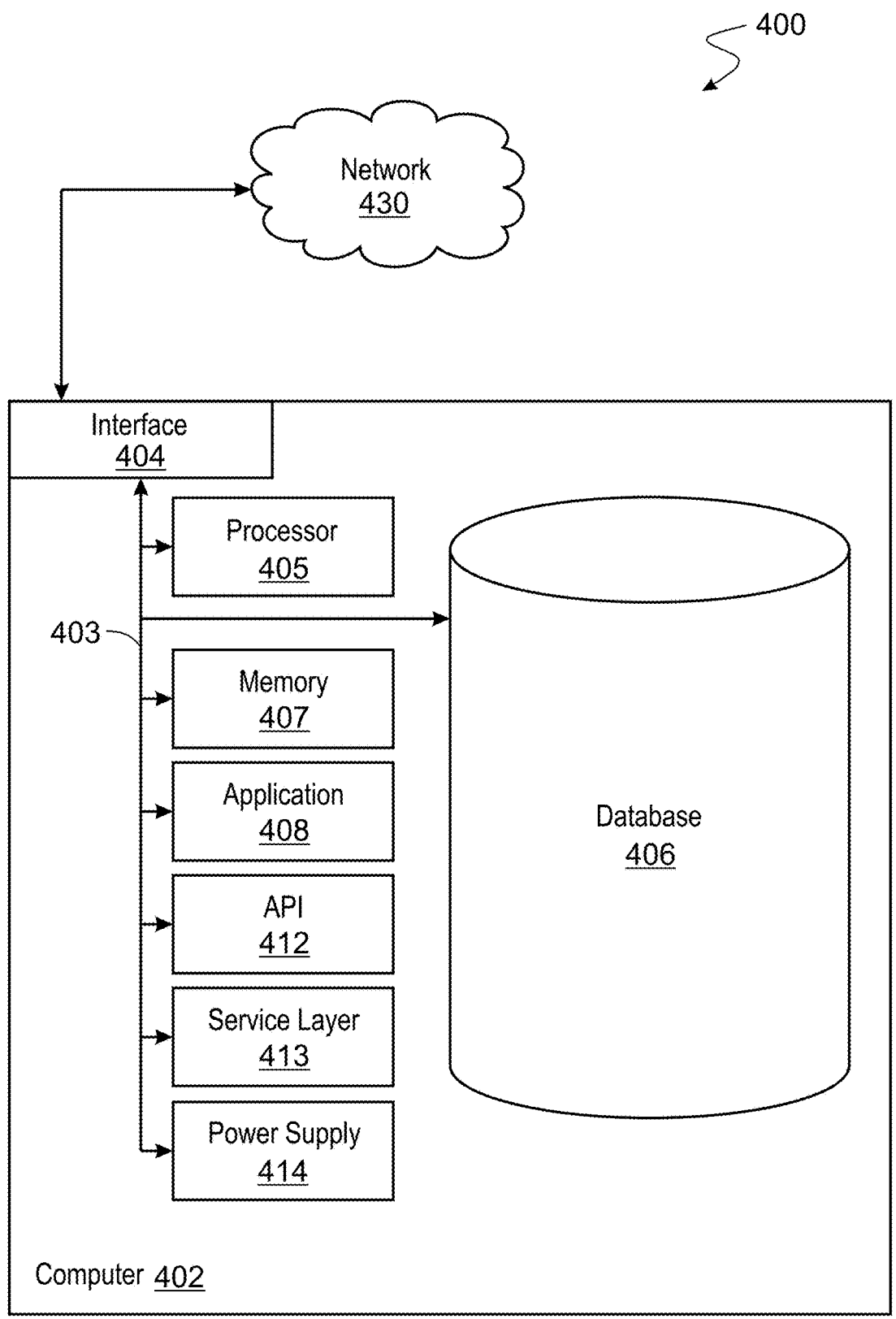
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method includes the following. Spatio-temporally-sampled data for electromagnetic (EM) wave propagation through a fluid in the conduit is acquired at each of a number of instants of time from each antenna of an array of at least two antennas distributed at predetermined locations along a conduit. A k-ω plot plotting curves having a kinematic relationship ω=ck is generated based on the spatio-temporally-sampled data and using a spectral-based algorithm technique, where ω is an angular frequency of a spectral component of EM disturbances, k is a wavenumber, and c is an unknown speed of the EM wave propagation. A spectral ridge on the curves is identified using the k-ω plot, and parameters for calculating a slope of the spectral ridge are determined. The slope of the spectral ridge is determined, and the speed of EM wave propagation is determined assuming a relation between the speed of EM wave propagation and the slope of the spectral ridge.

The foregoing and other described implementations can each, optionally, include one or more of the following features:

A first feature, combinable with any of the following features, where the array of the at least two antennas includes antennas distributed around a circumference of the conduit.

A second feature, combinable with any of the previous or following features, where the spectral-based algorithm technique uses a spectrum-like function of a speed EM wave propagation formation and parametric methods of solution.

A third feature, combinable with any of the previous or following features, where the spectral-based algorithm technique is a spectral-based algorithms using a deterministic maximum likelihood method selected from the group consisting of a Capon method and MUSIC method.

A fourth feature, combinable with any of the previous or following features, where the fluid is a liquid, a gas, or a multiphase fluid.

A fifth feature, combinable with any of the previous or following features, where a ridge is identified in the k-ω plot based on power or color intensity in the k-ω plot.

A sixth feature, combinable with any of the previous or following features, where determining the slope of the spectral ridge and the speed of the EM wave assuming a relation between the speed of EM wave and the slope of the spectral ridge.

In a second implementation, a non-transitory, computer-readable medium stores one or more instructions executable by a computer system to perform operations including the following. Spatio-temporally-sampled data for electromagnetic (EM) wave propagation through a fluid in the conduit is acquired at each of a number of instants of time from each antenna of an array of at least two antennas distributed at predetermined locations along a conduit. A k-ω plot plotting curves having a kinematic relationship ω=ck is generated based on the spatio-temporally-sampled data and using a spectral-based algorithm technique, where ω is an angular frequency of a spectral component of EM disturbances, k is a wavenumber, and c is an unknown speed of the EM wave propagation. A spectral ridge on the curves is identified using the k-ω plot, and parameters for calculating a slope of the spectral ridge are determined. The slope of the spectral ridge is determined, and the speed of EM wave propagation is determined assuming a relation between the speed of EM wave propagation and the slope of the spectral ridge.

The foregoing and other described implementations can each, optionally, include one or more of the following features:

A first feature, combinable with any of the following features, where the array of the at least two antennas includes antennas distributed around a circumference of the conduit.

A second feature, combinable with any of the previous or following features, where the spectral-based algorithm technique uses a spectrum-like function of a speed EM wave propagation formation and parametric methods of solution.

A third feature, combinable with any of the previous or following features, where the spectral-based algorithm technique is a spectral-based algorithms using a deterministic maximum likelihood method selected from the group consisting of a Capon method and MUSIC method.

A fourth feature, combinable with any of the previous or following features, where the fluid is a liquid, a gas, or a multiphase fluid.

A fifth feature, combinable with any of the previous or following features, where a ridge is identified in the k-ω plot based on power or color intensity in the k-ω plot.

A sixth feature, combinable with any of the previous or following features, where determining the slope of the spectral ridge and the speed of the EM wave assuming a relation between the speed of EM wave and the slope of the spectral ridge.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Spatio-temporally-sampled data for electromagnetic (EM) wave propagation through a fluid in the conduit is acquired at each of a number of instants of time from each antenna of an array of at least two antennas distributed at predetermined locations along a conduit. A k-ω plot plotting curves having a kinematic relationship ω=ck is generated based on the spatio-temporally-sampled data and using a spectral-based algorithm technique, where ω is an angular frequency of a spectral component of EM disturbances, k is a wavenumber, and c is an unknown speed of the EM wave propagation. A spectral ridge on the curves is identified using the k-ω plot, and parameters for calculating a slope of the spectral ridge are determined. The slope of the spectral ridge is determined, and the speed of EM wave propagation is determined assuming a relation between the speed of EM wave propagation and the slope of the spectral ridge.

The foregoing and other described implementations can each, optionally, include one or more of the following features:

A first feature, combinable with any of the following features, where the array of the at least two antennas includes antennas distributed around a circumference of the conduit.

A second feature, combinable with any of the previous or following features, where the spectral-based algorithm technique uses a spectrum-like function of a speed EM wave propagation formation and parametric methods of solution.

A third feature, combinable with any of the previous or following features, where the spectral-based algorithm technique is a spectral-based algorithms using a deterministic maximum likelihood method selected from the group consisting of a Capon method and MUSIC method.

A fourth feature, combinable with any of the previous or following features, where the fluid is a liquid, a gas, or a multiphase fluid.

A fifth feature, combinable with any of the previous or following features, where a ridge is identified in the k-ω plot based on power or color intensity in the k-ω plot.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of the exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    acquiring, at each of a number of instants of time from each antenna of an array of at least two antennas distributed at predetermined locations along a conduit, spatio-temporally-sampled data for electromagnetic (EM) wave propagation through a fluid in the conduit, the at least two antennas operating at transmitted frequencies that are above a first cutoff frequency of the conduit;
    generating, based on the spatio-temporally-sampled data and using a spectral-based algorithm technique, a k-ω plot plotting curves having a kinematic relationship relative to an angular frequency of a spectral component of EM disturbances, a wavenumber, and a speed of the EM wave propagation;

identifying, using the k-ω plot, a spectral ridge on the curves, and determining parameters for calculating a slope of the spectral ridge;

determining, using the spectral ridge on the curves and the parameters the slope of the spectral ridge;

determining the speed of EM wave propagation assuming a relation between the speed of EM wave propagation and the slope of the spectral ridge;

determining, using the speed of EM wave propagation and the slope of the spectral ridge, components of the fluid flowing in the conduit; and controlling wellbore operations based on the components of the fluid flowing in the conduit.

2. The computer-implemented method of claim 1, wherein the array of the at least two antennas comprises antennas distributed around a circumference of the conduit.

3. The computer-implemented method of claim 1, wherein the spectral-based algorithm technique uses a spectrum-like function of a speed EM wave propagation formation and parametric methods of solution.

4. The computer-implemented method of claim 3, wherein the spectral-based algorithm technique is a spectral-based algorithms using a deterministic maximum likelihood method selected from the group consisting of a Capon method and MUSIC method.

5. The computer-implemented method of claim 1, wherein the fluid is a liquid, a gas, or a multiphase fluid.

6. The computer-implemented method of claim 1, wherein a ridge is identified in the k-ω plot based on power or color intensity in the k-ω plot.

7. The computer-implemented method of claim 1, wherein determining the slope of the spectral ridge comprises an average phase velocity of the speed of EM wave.

8. A non-transitory, computer-readable medium storing one or more instructions executable by a computer system to perform operations comprising:

acquiring, at each of a number of instants of time from each antenna of an array of at least two antennas distributed at predetermined locations along a conduit, spatio-temporally-sampled data for electromagnetic (EM) wave propagation through a fluid in the conduit, the at least two antennas operating at transmitted frequencies that are above a first cutoff frequency of the conduit;

generating, based on the spatio-temporally-sampled data and using a spectral-based algorithm technique, a k-ω plot plotting curves having a kinematic relationship relative to an angular frequency of a spectral component of EM disturbances, a wavenumber, and a speed of the EM wave propagation;

identifying, using the k-ω plot, a spectral ridge on the curves, and determining parameters for calculating a slope of the spectral ridge;

determining, using the spectral ridge on the curves and the parameters the slope of the spectral ridge;

determining the speed of EM wave propagation assuming a relation between the speed of EM wave propagation and the slope of the spectral ridge;

determining, using the speed of EM wave propagation and the slope of the spectral ridge, components of the fluid flowing in the conduit; and controlling wellbore operations based on the components of the fluid flowing in the conduit.

9. The non-transitory, computer-readable medium of claim 8, wherein the array of the at least two antennas comprises antennas distributed around a circumference of the conduit.

10. The non-transitory, computer-readable medium of claim 8, wherein the spectral-based algorithm technique uses a spectrum-like function of a speed EM wave propagation formation and parametric methods of solution.

11. The non-transitory, computer-readable medium of claim 10, wherein the spectral-based algorithm technique is a spectral-based algorithms using a deterministic maximum likelihood method selected from the group consisting of a Capon method and MUSIC method.

12. The non-transitory, computer-readable medium of claim 8, wherein the fluid is a liquid, a gas, or a multiphase fluid.

13. The non-transitory, computer-readable medium of claim 8, wherein a ridge is identified in the k-ω plot based on power or color intensity in the k-ω plot.

14. The non-transitory, computer-readable medium of claim 8, wherein determining the slope of the spectral ridge comprises an average phase velocity of the speed of EM wave.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

acquiring, at each of a number of instants of time from each antenna of an array of at least two antennas distributed at predetermined locations along a conduit, spatio-temporally-sampled data for electromagnetic (EM) wave propagation through a fluid in the conduit, the at least two antennas operating at transmitted frequencies that are above a first cutoff frequency of the conduit;

generating, based on the spatio-temporally-sampled data and using a spectral-based algorithm technique, a k-ω plot plotting curves having a kinematic relationship relative to an angular frequency of a spectral component of EM disturbances, a wavenumber, and a speed of the EM wave propagation;

identifying, using the k-ω plot, a spectral ridge on the curves, and determining parameters for calculating a slope of the spectral ridge;

determining, using the spectral ridge on the curves and the parameters the slope of the spectral ridge;

determining the speed of EM wave propagation assuming a relation between the speed of EM wave propagation and the slope of the spectral ridge;

determining, using the speed of EM wave propagation and the slope of the spectral ridge, components of the fluid flowing in the conduit; and controlling wellbore operations based on the components of the fluid flowing in the conduit.

16. The computer-implemented system of claim 15, wherein the array of the at least two antennas comprises antennas distributed around a circumference of the conduit.

17. The computer-implemented system of claim 15, wherein the spectral-based algorithm technique uses a spectrum-like function of a speed EM wave propagation formation and parametric methods of solution.

18. The computer-implemented system of claim 17, wherein the spectral-based algorithm technique is a spectral-based algorithms using a deterministic maximum likelihood method selected from the group consisting of a Capon method and MUSIC method.

19. The computer-implemented system of claim 15, wherein the fluid is a liquid, a gas, or a multiphase fluid.

20. The computer-implemented system of claim 15, wherein a ridge is identified in the k-ω plot based on power or color intensity in the k-ω plot.

* * * * *